(12) United States Patent
Rachev et al.

(10) Patent No.: US 8,170,941 B1
(45) Date of Patent: May 1, 2012

(54) SYSTEM AND METHOD FOR GENERATING RANDOM VECTORS FOR ESTIMATING PORTFOLIO RISK

(75) Inventors: Svetlozar Todorov Rachev, Santa Barbara, CA (US); Stoyan Veselinov Stoyanov, Targovishte (BG); Gennady Samorodnitsky, Ithaca, NY (US); Georgi Kostov Mitoy, Sofia (BG)

(73) Assignee: FinAnalytica, Inc., Seattle, WA (US)

( * ) Notice: Subject to any disclaimer, the term of this patent is extended or adjusted under 35 U.S.C. 154(b) by 0 days.

(21) Appl. No.: 12/580,911

(22) Filed: Oct. 16, 2009

Related U.S. Application Data

(60) Provisional application No. 61/105,846, filed on Oct. 16, 2008.

(51) Int. Cl.
*G06Q 40/00* (2012.01)
(52) U.S. Cl. .................... 705/36 R; 705/39; 705/35
(58) Field of Classification Search .............. 705/35–37
See application file for complete search history.

(56) References Cited

U.S. PATENT DOCUMENTS

| | | | |
|---|---|---|---|
| 7,228,290 B2 * | 6/2007 | Browne et al. | 705/36 R |
| 2002/0019803 A1 * | 2/2002 | Muller | 705/38 |
| 2003/0061152 A1 * | 3/2003 | De et al. | 705/38 |
| 2007/0044505 A1 * | 3/2007 | Kaspar et al. | 62/509 |

OTHER PUBLICATIONS

1. Non-Patent Literature "Portfolio risk calculation and stochastic portfolio optimization by a copula based approach" by Durmus Tarik Karadag 2003 (herein after NPL1)*
Copula Statistics.pdf: Nelsen, Roger B. (1999), An Introduction to Copulas, New York: Springer, ISBN 0387986235.*
Efficient Sampling Techniques for Uncertainties in Risk Analysis, Environmental Progress (vol. 23, No. 2) Jul. 2004, Published online in Wiley InterScience (www.interscience.wiley.com). DOI 10.1002/ep.10020.*
Latin hypercube sampling and the propagation of uncertainty in analyses of complex systems J.C. Heltona, F.J. Davisb, Reliability Engineering and System Safety 81 (2003) 23-69, Received Jan. 28, 2003; accepted Feb. 25, 2003.*

* cited by examiner

*Primary Examiner* — Alexander Kalinowski
*Assistant Examiner* — Abhishek Vyas
(74) *Attorney, Agent, or Firm* — Patrick J. S. Inouye

(57) ABSTRACT

A system and computer-implemented method for generating random vectors for estimating portfolio risk is provided. Historical financial variable data of financial assets is stored in a memory. Parameters of a copula are estimated. Random vectors are generated from the copula. Risk for the financial assets is calculated based on the random vectors.

16 Claims, 2 Drawing Sheets

100

SYSTEM AND METHOD FOR GENERATING RANDOM VECTORS FOR ESTIMATING PORTFOLIO RISK

CROSS-REFERENCE TO RELATED APPLICATION

This non-provisional patent application claims priority under 35 U.S.C. §119(e) to U.S. provisional patent application Ser. No. 61/105,846, filed Oct. 16, 2008, the disclosure of which is incorporated by reference.

FIELD

The present invention relates in general to financial portfolio optimization and, specifically, to a system and method for generating random vectors for estimating portfolio risk.

BACKGROUND

Accurate modeling of returns of financial assets and exogenous risk factors or endogenous risk factors, often referred to collectively as financial variables or just variables, for the purposes of risk estimation and portfolio optimization involves two essential distinct components: (1) modeling of the distribution of the stand-alone variables and (2) modeling the dependence structure between the variables.

In this discussion, the topic of modeling dependence between financial variables via a factor model is not considered but this does not limit the validity and generality of the discussion. Even in the case of a factor model, a multivariate assumption should be made for the joint distribution of the factors returns, which brings the discussion back to the current topic. Furthermore, this is not dependent on the nature of the factors—whether they are fundamentals, observable or latent statistical factors.

Point (1) above involves taking account of real world phenomena required to accurately model the stand-alone variables such as clustering of the volatility effect, heavy-tails of the distribution, and skeweness of the distribution. Many studies have been carried out in the last 40 years for the development of mathematical models for this purpose including the use of ARMA-GARCH processes and application of heavy-tailed and skewed distributions.

At the same time, the problems posed by point (2) have been largely neglected. Only in the last 15 years have significant efforts been dedicated to scientific research into the area of application of copula functions to model dependency between variables in the field of finance.

Only relatively recently have practitioners realized that modeling stand alone returns distributions and their dependencies are two distinct components of a complete model. Whereas in general, both modeling of the distributions of the stand alone variable and their dependencies are required to build an accurate multidimensional model for the returns of a set of financial variables.

Until fairly recently, predictive modeling of the future behavior of financial variables was achieved by assuming a given multidimensional distribution model, such as the multivariate normal or the multivariate Student's t distribution for example. This method leads to making two separate assumptions simultaneously. First, an assumption about the one-dimensional distribution of the variables viewed as stand-alone ones. And second, an assumption for the dependence between the variables. For instance, many practitioners will use the assumption of a multivariate normal as a model for the behavior of stock returns which in turn implies: (1) the normal distribution is the one dimensional model and (2) the covariance matrix is the description of the dependence structure between stock returns.

Among many practitioners, the covariance matrix is considered the standard and practical approach to dependency modeling. This practice dates back to at least the development of Modern Portfolio Theory by Harry Markowitz in the 1950's. The covariance matrix is still the standard in the induction for portfolio optimization and risk computation systems.

Any practical dependency model has to be flexible enough to account for several phenomena observed empirically in real-world financial data including that the dependence is nonlinear with changes in the values of financial variables. For example, that the dependence between asset prices becomes greater during periods of financial market stress is well known.

Additionally, in general, the dependency between financial variables is asymmetric. For example, most asset prices become relatively more dependent during significant financial market downturns than during good times.

The industry standard dependence model implied by the multivariate normal distribution fails to incorporate both of the aforementioned phenomena. The reasons for that include:
 (i) First, the covariance matrix, which defines the dependence structure of financial returns, determines only linear dependencies, and the covariances are symmetric dependency measures.
 (ii) Second, tail events are asymptotically independent under the multivariate normal (Gaussian) distribution
 (iii) Third, the multivariate normal distributions describe only bivariate dependences.

In modeling financial returns of a portfolio of assets that the large downturns (losses) are more dependent (associated) than large upturns (positive returns) is often observed, thus an asymmetry of the dependence structure between the asset returns is observed, which is in contradiction with reason (i).

If a large bivariate sample is generated using bivariate normal distribution with correlation close +1, meaning that two financial returns outcomes that are very positively correlated are modeled, the very large values (generated big losses, or big large returns) will be approximately independent, and that is the essence of reason (ii). That contradicts that in financial markets often very large losses in financial markets "go together", that is a very big loss from one asset can lead to a very big loss of another one. This cannot be captured by modeling the asset returns with multivariate normal distribution, due to reason (ii).

Finally, very large losses go together in clusters, not just in the form of bivariate dependence, which contradicts reason (iii). One goal of the present invention is to described a copula-dependency model that is free of the deficiencies described above in reasons (i), (ii), and (iii).

From a historical perspective, modeling dependencies between financial variables advanced significantly in the 1990's. In theory, the most general possible way of describing dependence structure is through a copula function. For a vector of n variables, a copula function is an n-dimensional function satisfying certain properties, and which combines at least two one-dimensional distributions into a multivariate probability distribution.

Definition

Let d denote the number of securities, risk factors and residuals (the dimension), $I_d = [0, 1]^d$ the d-dimensional unit hype-cube. A copula is a probability distribution on $I_d$ whose projections on each of the d axes are all uniform distributions on [0,1].

There is an existence and uniqueness result, which guarantees that any multivariate distribution has a unique copula behind the distribution under some regularity assumptions. Conversely, any copula function leads to a proper multivariate distribution, given a set of assumptions for the one-dimensional distributions. In effect, copula functions are the most general possible way of describing dependence. However, from a practical viewpoint these methods are often plagued by the difficulty in choosing a suitable copula function which is capable of describing the empirically observed phenomena in the data and at the same time be computationally feasible for use with large portfolios (for example, a large number of dimensions).

SUMMARY

The system and method described herein overcomes many of the deficiencies of existing approaches to modeling assets returns by incorporating a flexible copula function based on a mixture between two copula functions. The first copula function arises from a multivariate distribution, allowing for a location-scale mixture representation and describes the "central" part of the dependency model. The second copula function is an empirical copula of the extremes or tails of the dependency model. The system allows for choosing the weight applied to each of the two copula functions to create a general copula. In the rest of this discussion, the general copula function is referred to simply as the copula, with each of the two component functions being the sub-copulas.

As a first step, the system calibrates the parameters of the copula function using as input the sub-copulas distributional assumptions. The system then produces scenarios from the fitted copula function for the dependency and scenarios from the fitted sub-copulas variables and uses both to produce scenarios from a complete multivariate model. The dependency properties of the scenarios generated are controlled by the relative weight of the two sub-copulas comprising the copula. Once generated, the scenarios are used to calculate the risk of a portfolio of financial instruments, or to calculate the optimal risk-adjusted allocation among a set of financial instruments.

One embodiment provides a system and computer-implemented method for generating random vectors for estimating portfolio risk. Historical financial variable data of financial assets is stored in a memory. Parameters of a copula are estimated. Random vectors are generated from the copula. Risk for the financial assets is calculated based on the random vectors.

A further embodiment provides a system and computer-implemented method for estimating portfolio risk from generated random vectors is provided. Historical data regarding financial variables of financial assets is stored in a memory including a database. The historical data is transformed to a unit hypercube. Parameters of a sub-copula comprising a central point of the hypercube and an other sub-copula including extremes of the hypercube are estimated. A copula is generated from the sub-copula and the other sub-copula. Random vectors are generated from the copula. Risk for a portfolio of financial assets is calculated based on the random vectors Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
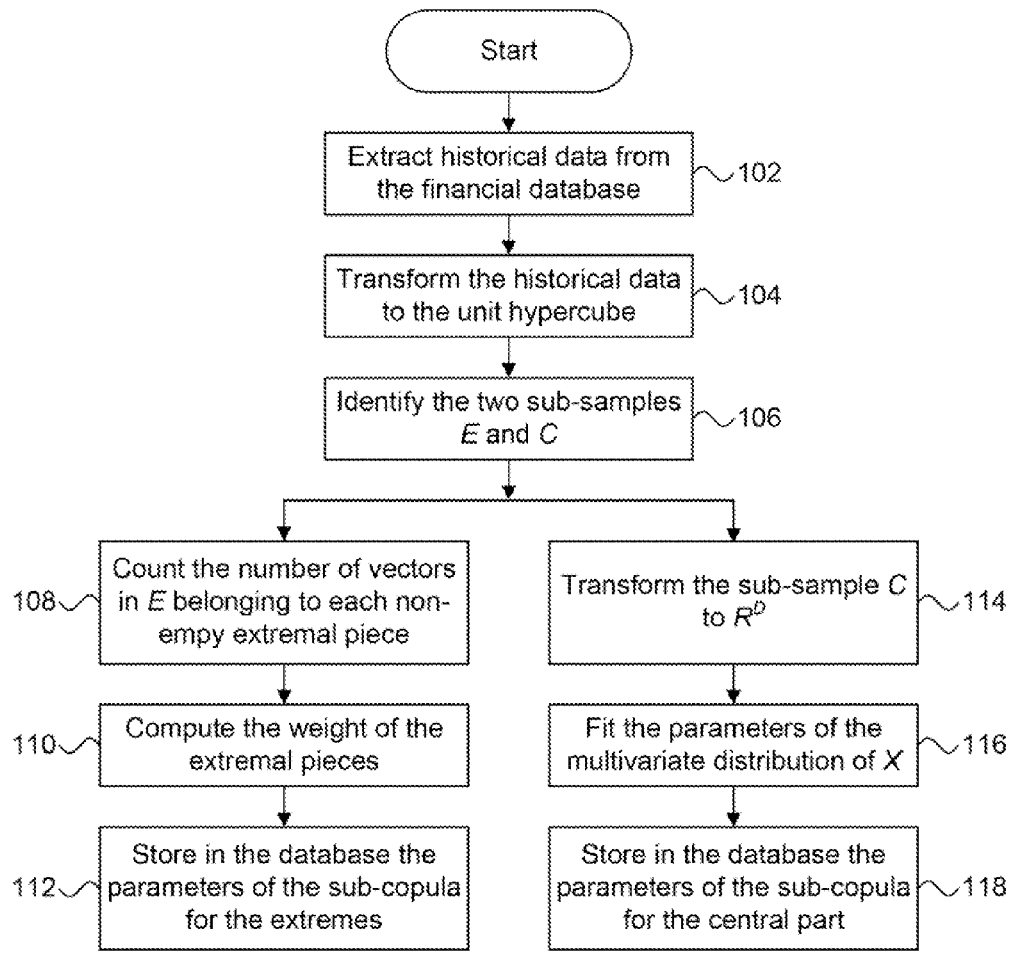
FIG. 1 is a flow diagram showing a method for parameter estimation of a copula using a sample of historical data.

The system is applicable to portfolios containing at least two financial assets, wherein the assets are of one or more types or classes. The system is also applicable to a portfolio containing one or more sub-portfolios. In addition, the system is applicable to analysis of a portfolio comprised of at least two sub-portfolios of one or more assets of one or more asset types and where the sub-portfolios are managed by one or more organizations or individuals for which the person performing the analysis has only partial or no knowledge of the composition of each sub-portfolio.

The system can be implemented using any suitable type of automatic computing device with suitable volatile and non-volatile storage and numerical computation capability, such as described in commonly-assigned U.S. Patent application Publication No. 2005/0033679, pending, the disclosure of which is incorporated by reference. Control of the system can be manual, completely automated (including automatically changing the allocation of assets in the portfolio) or at any degree of automation desired. Some embodiments will state the computed results in terms of estimation results. Other embodiments will report results in terms of computed portfolio and portfolio items risk using some risk measure and the Monte Carlo algorithm for generation of future portfolio and portfolio items scenarios.

Description of Sub-Copula Functions

In this section the two sub-copula functions are described.

Empirical Sub-Copula for Extremes

Starting with observations which are a collection of N d-dimensional vectors $$X^{(i)}=(X_1^{(i)}, X_2^{(i)}, \ldots, X_d^{(i)}), i=1,2,\ldots,N,$$

where $(X_1^{(i)}, X_2^{(i)}, \ldots, X_d^{(i)})$ are the d observations in the ith vector.

Upon fitting of the marginal distributions, the observations are mapped into a collection of observations in $$I_d: Y^{(i)}=(Y_1^{(i)}, Y_2^{(i)}, \ldots, Y_d^{(i)}), i=1,2,\ldots,N,$$

with $Y^{(i)}=F(X^{(i)})$, $i=1,2,\ldots,N$ for some function F composed of the marginal distribution functions.

A small $\epsilon>0$ is chosen and this number is used to denote where the extrema begin ($\epsilon>0$ can be any number between 0 and 1—a likely choice can be values close to 0.01 and 0.005. Those skilled in the art will recognize that the actual value of $\epsilon$ is a matter of choice and may be taken to depend on sample size.

A copula is constructed as follows. The d-dimensional unit hypercube $I_d$ consists of two parts, (i) the middle part, the d-dimensional sub-hypercube that covers the central part of the hypercube $I^d$, is defined by $$M_d(\epsilon)=[\epsilon, 1-\epsilon]^d$$

and (ii) the narrow strip hugging the sides and the corners $$E_d(\epsilon)=I_d-[\epsilon, 1-\epsilon]^d,$$

that is, the rest of the unit hypercube $I_d$ when the $M_d(\epsilon)=[\epsilon, 1-\epsilon]^d$ is removed.

We select the number $\epsilon$ in such a way that $m=N\epsilon$ is a whole number, which is not a problem for large sample sizes, and that for each security $j=1, 2, \ldots, d$ $$\sum_{i=1}^{N} 1(Y_j^{(i)} < \varepsilon) = \sum_{i=1}^{N} 1(Y_j^{(i)} > 1 - \varepsilon) = m$$

where $1(\cdot)$ stands for the indicator function. That is, exactly m of the N observations for each security will be less than $\epsilon$ and greater than $1-\epsilon$ (for instance, be in "the tails"). In practice this may be difficult to achieve precisely. However, since every transformed security is approximately uniformly distributed (if the model for the marginal distribution is reasonable), these numbers should not be too far away from m, and one can make sure that each security falls the expected number of times in the extreme zones by making the width of the strip a bit different for different sides of the hypercube (that is, make $\epsilon=\epsilon_j^{\pm}$, with allowing dependence on j and on high or low extreme. Nothing in the discussion below will change, and the same $\epsilon$ is assumed for simplicity of presentation. In any case, as mentioned above, the various $\epsilon$ s should be close to each other.)

Notice that the extremal strip $E_d(\epsilon)$ can be thought as consisting of pieces which are denoted by $$A(i_1, i_2, \ldots, i_d)$$

where $i_j$ takes values $-1, 0, 1$ and the piece $A(0,0, \ldots, 9)$ is not allowed. Each $A(i_1, i_2, \ldots, i_d)$ is a (hyper)-rectangle, for example, $$A(1,1, \ldots, 1) = (1-\epsilon, 1]^d$$

is the north-east corner of the hyper-cube (all securities are in the positive extremal zone).

$$A(-1, 1, \ldots, 1) = \begin{cases} (u_1, u_2, \ldots, u_d) \in I_d: \\ u_1 < \varepsilon, u_j > 1 - \varepsilon \text{ for } j = 2, \ldots, d \end{cases}$$

is the part of the strip where the first security in the negative extremal zone, while the rest are in the positive extremal zone, $$A(0, 1, \ldots, 1) = \begin{cases} (u_1, u_2, \ldots, u_d) \in I_d: \\ \varepsilon < u_1 < 1 - \varepsilon, u_j > 1 - \varepsilon \text{ for } j = 2, \ldots, d \end{cases}$$

is the part of the strip where the first security is not in any extremal zone, while the rest are in the positive extremal zone. There are $3^d-1$ different pieces like that but most of them will not need any attention.

For each transformed observation, $Y^{(i)}$ mark the piece $A(i_1, i_2, \ldots, i_d)$ into which the observation falls, if any. Most observations will not fall in any of the pieces (since they do not have any extreme movements), and at most N of the pieces of the strip will be marked.

For each marked piece $A(i_1, i_2, \ldots, i_d)$, count the number $k(i_1, i_2, \ldots, i_d)$ of observations falling into that piece. Note that at most N (and likely far less than that) of the numbers have to be remembered. Having done that, the model for a copula will first put the weight of $$w(i_1, i_2, \ldots, i_d) = \frac{k(i_1, i_2, \ldots, i_d)}{N}$$

into each one the marked pieces and distribute this weight uniformly over that piece.

This constructs a sub-probability measure on $I_d$. Notice that by construction its projection on each axis puts the weight of $$\frac{m}{N} = \varepsilon$$

both on $[0, \epsilon)$ and $(1-\epsilon, 1]$ and uniformly distributes it there, and it puts the weight of $$\frac{K_E - 2m}{N} = \frac{K_E}{N} - \varepsilon$$

on the middle part $[\epsilon, 1-\epsilon]$, where $K_E$ is the total number of observations that fall in the extreme zone ($K_E$ is an upper bound on the number of marked pieces above). Furthermore, that mass is also uniformly distributed over $[\epsilon, 1-\epsilon]$. Therefore, to compete the construction of a copula a "mini-copula", or a sub-copula, is built for the middle part $M_d(\epsilon)$. This middle part describes the center of the distribution, not the extremes, and so one can put one of the standard copulas there, for example, normal, T, or other standard copulas.

In summary, a copula is constructed by looking separately on the middle part of the hypercube, and the extreme strip around the sides of the hypercube. For the middle part we can use one of the standard copulas. For the extreme strip we look at the extremes of the data. Thus, for example, the piece $A(1,1,-1,0,0 \ldots, 0)$ of the extreme strip corresponds to extreme positive movements of the first two securities, an extreme negative movement of the third security, and no extreme movements of the rest of the securities. If such a scenario has been observed in the existing observations, then the piece is marked, and is assigned the corresponding weight. Furthermore, the weight is uniformly spread over that piece, and so there is some fluctuation in the future scenarios in exactly what proportions these extremal movements will occur.

Those skilled in the art will recognize that something similar to an "empirical" copula is used in the extremes, and a standard one in the middle.

Parametric Sub-Copula for Central Part of Distribution

The sub-copula function for the central part of the distribution is derived from a multivariate distribution allowing for the following stochastic representation:

$$X := \mu + \gamma W + g(W) Z$$

where Z is an infinitely divisible random vector, W is a positive random variable independent of Z, $g(x): [0, \infty) \to [0, \infty)$ is a monotonically increasing function, $\mu$ and $\gamma$ are two real-valued vectors. W and Z are not necessarily independent, but in many applications, and for simplicity, that W and Z are independent is assumed. A more general case can also be considered in the above formula: $W=(W(1), \ldots, W(n))$ is an n-dimensional vector with possibly dependent components. Vector W is dependent or independent of vector $Z=(Z(1), \ldots, Z(n))$, n is the vector dimensionality. Then, in the above formula the multiplication is understood as component-wise product, for example: g(W)Z=(g1(W(1)*Z(1), . . . , gn(W(n)*Z(n)), where gi(x): [0, ∞)–>[0, ∞) for all i=1, . . . , n.

Particular cases of X can include, but are not limited to:

multivariate normal distribution—appears when g(x)=1 and γ=0 and Z has multivariate normal distribution, Z ∈ N(0, Σ), where Σ denotes the covariance matrix.

multivariate Student's t distribution—appears when Z has multivariate normal distribution, Z ∈ N(0, Σ), where Σ denotes the covariance matrix, $g(x)=\sqrt{x}$, W has an inverse Gamma distribution, and γ=0.

multivariate skewed Student's t distribution—appears when Z has multivariate normal distribution, Z ∈ N(0, Σ), where Σ denotes the covariance matrix, $g(x)=\sqrt{x}$ and W has an inverse Gamma distribution.

multivariate Laplace distribution—when Z has multivariate normal distribution, Z ∈ N(0, Σ), where Σ denotes the covariance matrix, $g(x)=\sqrt{x}$ and W has an exponential distribution with mean equal to one, and γ=0.

multivariate skewed Laplace distribution—when Z has multivariate normal distribution, Z ∈ N(0, Σ), where Σ denotes the covariance matrix, $g(x)=\sqrt{x}$ and W has an exponential distribution with mean equal to one.

multivariate skewed sub-Gaussian distribution—when Z has multivariate normal distribution, Z ∈ N(0, Σ) where Σ denotes the covariance matrix, $g(x)=x^{1/\alpha}$ and W is a stable subordinator with an index of stability equal to alpha.

multivariate generalized Hyperbolic distribution—when Z has multivariate normal distribution, Z ∈ N(0, Σ), where Σ denotes the covariance matrix, $g(x)=\sqrt{x}$ and W has a generalized inverse Gaussian distribution. For example, the multivariate skewed Student's t, the multivariate skewed Laplace, and the multivariate normal distributions belong to this class.

More general classes include:

multivariate normal mean-variance mixtures—when Z has multivariate normal distribution, Z ∈ N(0, Σ) where Σ denotes the covariance matrix, and W is a positive random variable independent of Z. The generalized Hyperbolic distribution is a particular example of a normal mean-variance mixture. The normal variance mixture models such as the Student's t, the sub-Gaussian stable distribution, and so on, which are very popular in finance, arise from the normal mean-variance mixture when setting γ=0.

multivariate infinitely divisible elliptical mean-variance mixtures—when Z has an infinitely divisible elliptical distribution and W is a positive random variable independent of Z. All normal mean-variance mixtures belong to this class.

The multivariate distributions of this form are particularly attractive because their copulas allow for different kinds of tail dependence and are parsimonious as they contain only a few parameters. Furthermore, the stochastic representation allows for computationally cheap random number generation, which is critical in order to make the entire method practical. Even if the distribution functions of the marginals do not enjoy close-form expressions, they can be approximated via the sample distribution functions constructed through generated scenarios.

Special Cases

Those skilled in the art will realize that the general copula model reduces to many known copulas based on multivariate elliptical distributions.

If the parameter ϵ=0, then the sub-copula for the extremes disappears and only the sub-copula for the central part remains. For example:

the Gaussian copula is obtained, if ϵ=0 and, in addition, g(x)=1 and γ=0 the Student's t copula is obtained, if ϵ=0, and, in addition, γ=0, Z ∈ N(0, Σ), where Σ denotes the covariance matrix, $g(x)=\sqrt{x}$ and W has an inverse Gamma distribution.

the skewed Student's t copula is obtained, if ϵ=0, and, in addition, Z ∈ N(0, Σ), where Σ denotes the covariance matrix, $g(x)=\sqrt{x}$ and W has an inverse Gamma distribution.

the Laplace copula is obtained, if ϵ=0, and, in addition, γ=0, Z ∈ N(0, Σ), where Σ denotes the covariance matrix, $g(x)=\sqrt{x}$ and W has an exponential distribution with mean equal to one.

the skewed Laplace copula is obtained, if ϵ=0, and, in addition, Z ∈ N(0, Σ), where Σ denotes the covariance matrix, $g(x)=\sqrt{x}$ and W has an exponential distribution with mean equal to one.

the skewed sub-Gaussian copula is obtained, if ϵ=0, and, in addition, Z ∈ N(0, Σ), where Σ denotes the covariance matrix, $g(x)=x^{1/\alpha}$ and W is a stable subordinator with an index of stability equal to alpha.

the generalized hyperbolic copula is obtained, if ϵ=0, and, in addition, Z ∈ N(0, Σ), $g(x)=\sqrt{x}$ and W has a generalized inverse Gaussian distribution.

Those skilled in the art will understand that in this fashion, the general classes of the normal mean-variance mixture copula can be obtained and, even more generally, the infinitely divisible elliptical mean-variance mixture copula.

System Concerning Estimation of Parameters of Copula

The parameter estimation method estimates the parameters of the two sub-copulas from a sample of historical data of the risk variables. FIG. 1 is a flow diagram showing a method for parameter estimation of the copula using a sample of historical data. The method is divided into two stages, the parameters of the sub-copula of the extremes are estimated and the parameters of the sub-copula for the central part are estimated. Those skilled in the art will realize that the order of execution of the two steps is not material. What important is to obtain two sets of observations, those which will be used in the parameter estimation of the sub-copula for the extremes, and those which will be used for the sub-copula of the central part. After these two sets of observations have been identified, the parameters of which sub-copula to estimate first is then chosen.

The available sample is denoted by $(H^1, H^2, \ldots, H^K)$ where $H^1 \in R^d$ denotes a vector of observed values for all risk variables at a given moment of time. Thus, K observations are assumed on the multivariate distribution. The sample is extracted from a database containing historical data for the corresponding financial variables (block 102). In order to extract the relevant data, an evaluation date identifying the date of the most recent observation and a time window identifying the size of the sample are necessary. These parameters are specified as input to the method.

The parameters of the sub-copula for the extremes are represented by the weights of the non-empty external pieces and the parameters of the copula for the central part are represented by the parameters of the multivariate distribution of X.

The method proceeds as follows.

1. Transform the available observations from $R^d$ to the unit hypercube in $R^d$ (block 104) making use of the transform $$V_j^k = G_j(H_j^k), k=1, K$$

where $G_1(x)$, $G_2(x)$, $G_d(x)$ stand for the distribution functions of the corresponding financial variables. Those skilled in the art will realize that there are several ways to obtain the functions G and any suitable algorithm can be used. For this reason, the functions G are considered as input parameters having been computed and stored by an appropriate computing device, and read from non-volatile memory. The distribution functions G can either be the empirical distribution functions, or they may appear as a result of fitting one-dimensional parametric models to the data of each financial variable. As a result, $(V^1, V^2, \ldots, V^K)$ belongs to the d-dimensional hypercube.

2. Verify which of the vectors belong to the pieces $A(i_1, i_2, \ldots, i_d)$ and store each piece in a database with appropriate reference keys. Next, denote the new sample of marked observations by $E=(V_k^1, V^{k_2}, \ldots, V^{k_E})$, which is a sub-sample to be used in fitting the parameters of the sub-copula in the extremes, and the remaining ones by $C=(V^{c_1}, V^{c_2}, \ldots, V^{c_m})$ which will be used for fitting the sub-copula for the central part (block 106).

Fit Parameters of Sub-Copula for Extremes

The parameters of the sub-copula for the extremes are fitted using the sub-sample E obtained in a previous step. If the sub-sample E is empty, proceed to fitting the parameters of the copula for the central part.

1. Index the non-empty pieces $A(i_1, i_2, \ldots, i_d)$ as stored in the non-volatile memory. Only the non-empty pieces are indexed, since looping through all $3^d-1$ pieces could be a daunting task when d is high enough.
2. Select a non-empty $A(i_1, i_2, \ldots, i_d)$ piece.
3. Count the observations from E belonging to the piece (block 108), $k(i_1, i_2, \ldots, i_d)$, and calculate the weight of the piece by dividing the number of observations belonging to the piece by the total number of observations in the sub-sample E, $k(i_1, i_2, \ldots, i_d)/K_E$ (block 110).
4. Return to Step 2 until all pieces are processed and stored them (block 112).

Fit Parameters of Sub-Copula for Central Part

The parameters of the copula for the central part are estimated using the sub-sample C.

1. Transform the sub-sample from the unit hypercube to $R^d$ (block 114) by means of the transform $$\tilde{H}_j^k = T_j(V_j^{ck}), k=1, m$$

where the transforms $T_1(u), T_2(u), \ldots, T_d(u): [0,1] \to R$ are monotonically increasing. Those skillful in the art will realize that the transforms T could be the inverse distribution functions of the marginals of the multivariate distribution of X or the empirical inverse distribution functions of the corresponding marginal. In some embodiments, the transform T could be implemented as a closed-form expression or as an approximation, if a closed-form expression is not available.

2. Fit the parameters of the multivariate distribution of X using the sample $(\tilde{H}^1, \tilde{H}^2, \ldots, \tilde{H}^m)$ (block 116) and store them (block 118).

System Concerning Generation of Scenarios from Copula

Figure 2:
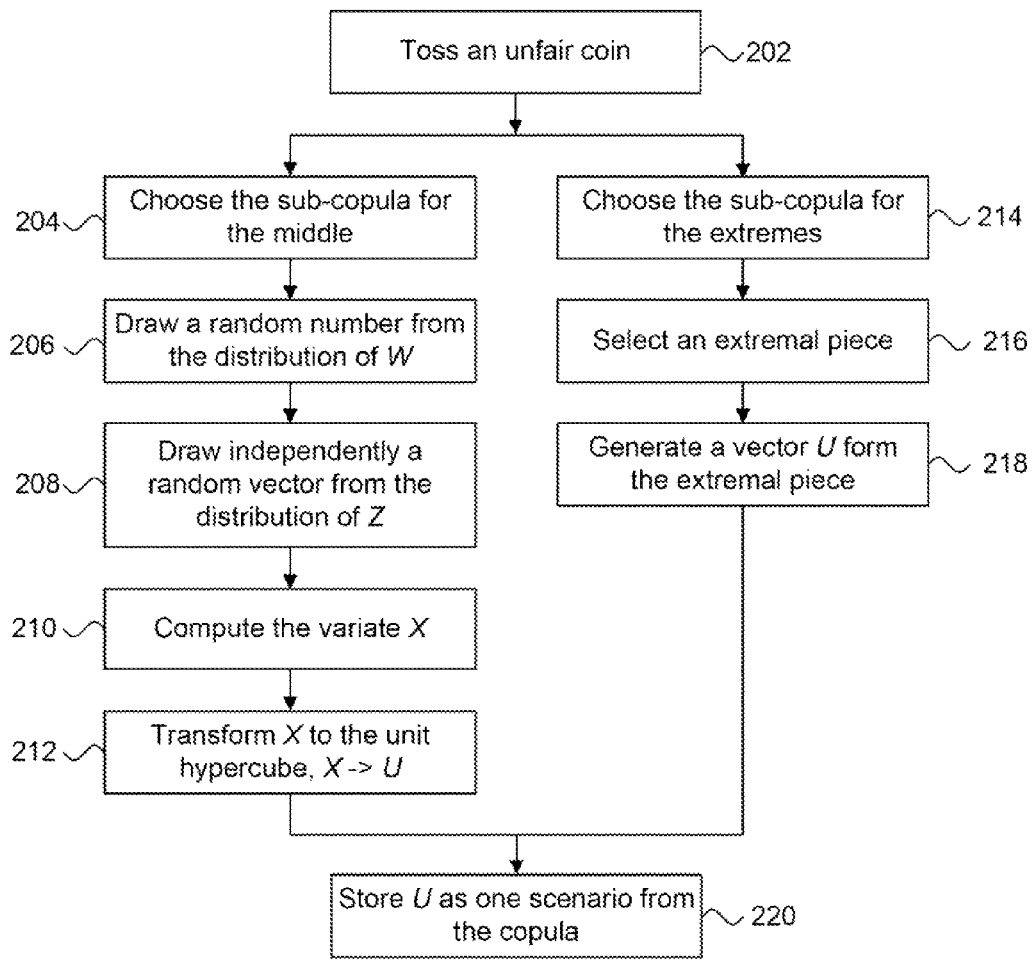
FIG. 2 is a flow diagram showing a method for generation of a random vector from the copula given the copula parameters.

FIG. 2 is a flow diagram showing a method for generation of a random vector from the copula given the copula parameters. Scenarios from this type of copula are generated according to the following procedure:

1. Tossing an unfair coin (block 202), by the system, with two sides Head and Tail. The probability for Head is $$1 - \frac{K_E}{N}$$

and the probability for Tail is $$\frac{K_E}{N}.$$

2. If Head occurs when the coin is tossed choose the standard copula in the middle, in other words, with probability $$1 - \frac{K_E}{N}$$

use the standard copula in the middle (block 204). Produce $(u_1, u_2, \ldots, u_d)$ and return the scaled vector $$((1-2\epsilon)u_1+\epsilon, (1-2\epsilon)u_2+\epsilon, \ldots, (1-2\epsilon)u_d+\epsilon)$$

3. If Tail occurs (which will happen with probability)

$$\frac{K_E}{N}$$

(block 214), select one of the marked pieces $$A(i_1, i_2, \ldots, i_d)$$

with probability $$\frac{k(i_1, i_2, \ldots, i_d)}{K_E}$$

(block 216). Then generate $(u_1, u_2, \ldots, u_d)$ (block 218) by choosing randomly an element of the marked piece $A(i_1, i_2, \ldots, i_d)$ and return back this element in the marked piece $A(i_1, i_2, \ldots, i_d)$. All elements in $A(i_1, i_2, \ldots, i_d)$ are assumed equally probable.

4. When Head occurs (Block 204) the random vector $(u_1, u_2, \ldots, u_d)$ is generated from the sub-copula according to the stochastic representation provided in the previous section. The method has the following steps:

(a) Generate a random number $W_1$ from the random variable W (block 206)
(b) Generate a vector $Z^1$ from the multivariate random variable Z independently of W (block 208)
(c) Calculate $X_1$ (block 210) according to the equation $$X^1 = \mu + \gamma W_1 + g(W_1)Z^1$$

where $\mu$ and $\gamma$ are two real-valued vectors which can either be fitted by a different algorithm or specified as user-input as a part of a stress-test scenario, and the function $g(x)$ is chosen in advance.

(d) Compute $u_j = F_j(X_j^1)$ where the function $F_j$ is the distribution function of the j-th marginal of the random vector X and $X_j^1$ is the j-th component of the vector $X^1$ generated on the previous step (block 212).

5. As a result whether Head or Tail happens, at the end, we obtain the scenario $U=(u_1, u_2, \ldots, u_d)$ as one scenario for the copula (Block 220)

The steps above are repeated until the desired number of scenarios are obtained.

The most computationally demanding step is (d) since the distribution function may not be known in closed form. In order to make the method practical for high dimensional cases, a simplified approach is used by approximating the distribution function $F_j$ by the sample distribution function. To this end, we a large sample $X_{j1}, X_{j2}, \ldots, X_{jn}$ is generated for the j-th marginal using the stochastic representation for this marginal $$X_j = \mu_j + \gamma_j W + g(W)Z$$

where $\mu_j$ and $\gamma_j$ denote the j-th components of the vectors $\mu$ and $\gamma$. Then the distribution function is approximated with the sample distribution function $$\hat{F}_j(x) = \frac{1}{n}\sum_{k=1}^{n} I\{X_{jk} \leq x\}$$

Those skilled in the art will recognize that the actual value of n is a matter of choice and that the sample $X_{j1}, X_{j2}, \ldots, X_{jn}$ can be produced as a pre-step in the method described above. Further embodiments may include this as a separate step while the method is running. In still further embodiments, step (c) can be executed as many times as necessary and the corresponding marginal scenarios $X_{j1}, X_{j2}, \ldots, X_{jn}$ can be extracted from the generated vectors.

System Concerning Calculation of Portfolio Risk and Optimal Portfolios

The generated simulations from the copula represent the dependence model of the financial variables that are considered. In order to produce simulations and be capable of computing risk statistics, the marginal distributions of the returns of the financial variables are needed. In one embodiment, the marginal model can be represented by the sample distribution function constructed on the basis of the observed returns. In a further embodiment, the distribution function could be a parametric one, the parameters of which are estimated by another algorithm. Denote the distribution functions of the financial variable returns by $G_1(x), G_2(x), \ldots, G_d(x)$ and the random vectors generated by the copula algorithm by $U^1, U^2, \ldots, U^n$ where n denotes the number of scenarios. The multivariate scenarios to be used for the purposes of risk estimation are obtained according to the formula:

$$Y_j^k = G_j^{-1}(U_j^k)$$

where $G_j^{-1}(p)$ denotes the inverse of the distribution function of the j-th financial variable. In this way, multi-dimensional scenarios $Y^1, Y^2, \ldots, Y^n$ are obtained. In one embodiment, these scenarios can be utilized directly for risk estimation, for example if the portfolio consists of stocks then $Y^1, Y^2, \ldots, Y^n$ represent stock returns and the portfolio returns are computed as a linear combination of $Y^1, Y^2, \ldots, Y^n$. In a further embodiment, they can be used in financial instrument calculators which valuate complex products from the portfolio in the generated states of the world.

In still further embodiments, the scenarios $Y^1, Y^2, \ldots, Y^n$ can be used for the purposes of portfolio optimization when the risk measure is the Conditional Value-at-Risk.

While the invention has been particularly shown and described as referenced to the embodiments thereof, those skilled in the art will understand that the foregoing and other changes in form and detail may be made therein without departing from the spirit and scope.

What is claimed is:

1. A system for generating random vectors for estimating portfolio risk, comprising:
    a memory comprising a database configured to store historical financial variable data of financial assets;
    a processor configured to execute computer executable code stored in program modules, comprising:
        an estimation module estimating parameters of a copula comprising an empirical sub-copula and a parametric sub-copula, wherein the empirical sub-copula comprises a d-dimensional unit hypercube $I_d$ comprising a middle part $M_d(\epsilon)$ and a narrow strip $E_d(\epsilon)$, the middle part $M_d(\epsilon)$ derived according to the representation:

$$M_d(\epsilon) = [\epsilon, 1-\epsilon]^d$$

and the narrow strip $E_d(\epsilon)$ derived according to the representation:

$$E_d(\epsilon) = I_d - [\epsilon, 1-\epsilon]^d$$

where the d-dimensional unit hypercube $I_d$ comprises projections on each of a set of d axes are all uniform distributions on [0,1], and a parametric sub-copula, wherein the parametric sub-copula is derived from a multivariate distribution according to the representation:

$$X := \mu + \gamma W + g(W)Z$$

where Z is an infinitely divisible random vector, W is a positive random variable independent of Z, g(x): $[0,\infty) \to [0,\infty)$ is a monotonically increasing function, and $\mu$ and $\gamma$ are two real-valued vectors on the narrow strip $E_d(\epsilon)$, the empirical sub-copula being defined using the same multivariate distribution;
        a generation module generating random vectors from the copula; and
        a risk module calculating risk for the financial assets based on the random vectors.

2. A system according to claim 1, wherein the random vectors are generated for stand-alone financial variables.

3. A system according to claim 2, further comprising one of stored scenarios for future market values to determine risk statistics and stored scenarios for future market values to compute optimal portfolio allocation.

4. A system according to claim 1, wherein the random vectors are generated for predictive variables or residuals in a factor model comprising one of a statistical factor model, a fundamental factor model, and a time-series factor model.

5. A system according to claim 4, further comprising one of stored scenarios for future market values to determine risk statistics and stored scenarios for future market values to compute optimal portfolio allocation.

6. A computer-implemented method for generating random vectors for estimating portfolio risk, comprising the steps of:
    storing historical financial variable data of financial assets in a memory comprising a database;
    estimating parameters of a copula comprising an empirical sub-copula and a parametric sub-copula, wherein the parametric sub-copula is defined on a middle part $M_d(\epsilon)$ on a d-dimensional unit hypercube $I_d$ and the empirical sub-copula is defined on a narrow strip $E_d(\epsilon)$, the middle part $M_d(\epsilon)$ derived according to the representation:

$$M_d(\epsilon) = [\epsilon, 1-E]^d$$

for any numbers ϵ in [0,1] and the narrow strip $E_d(\epsilon)$ derived according to the representation:

$$E_d(\epsilon) = I_d - [\epsilon, 1-\epsilon]^d$$

where the copula represented by the parametric sub-copula and the empirical sub-copula is defined on the d-dimensional unit hypercube $I_d$ and comprises projections on each of a set of d axes, which are all uniform distributions on [0,1] on the middle part $M_d(\epsilon)$ and the parametric sub-copula, wherein the parametric sub-copula is derived from a multivariate distribution according to the representation:

$$X := \mu + \gamma W + g(W)Z$$

where Z is an infinitely divisible random vector, W is a positive random variable independent of Z, g(x): [0, ∞)−>[0, ∞) is a monotonically increasing function, and μ and γ are two real-valued vectors on the narrow strip $E_d(\epsilon)$, the empirical sub-copula being defined using the same multivariate distribution;

generating random vectors from the copula; and calculating risk for the financial assets based on the random vectors, wherein the steps are performed by a suitably programmed computer.

7. A computer-implemented method according to claim 6, wherein the random vectors are generated for stand-alone financial variables.

8. A computer-implemented method according to claim 7, further comprising one of stored scenarios for future market values to determine risk statistics and stored scenarios for future market values to compute optimal portfolio allocation.

9. A computer-implemented method according to claim 6, wherein the random vectors are generated for predictive variables or residuals in a factor model comprising one of a statistical factor model, a fundamental factor model, and a time-series factor model.

10. A computer-implemented method according to claim 9, further comprising one of stored scenarios for future market values to determine risk statistics and stored scenarios for future market values to compute optimal portfolio allocation.

11. A system for estimating portfolio risk from generated random vectors, comprising:

a memory comprising a database configured to store historical data regarding financial variables of financial assets;

a processor configured to execute computer executable code stored in program modules, comprising:

a transform module for transforming the historical data to a unit hypercube;

an estimation module estimating parameters of a sub-copula comprising a central point of the hypercube and an other sub-copula comprising extremes of the hypercube, wherein the sub-copula comprising the central point of the hypercube is derived from a multivariate distribution according to the representation:

$$X := \mu + \gamma W + g(W)Z$$

where Z is an infinitely divisible random vector, W is a positive random variable independent of Z, g(x): [0, ∞)−>[0, ∞) is a monotonically increasing function, and μ and γ are two real-valued vectors and parametric sub-copula is defined on a middle part $M_d(\epsilon)$ on a d-dimensional unit hypercube $I_d$ and the empirical sub-copula is defined on a narrow strip $E_d(\epsilon)$, the middle part $M_d(\epsilon)$ derived according to the representation:

$$M_d(\epsilon) = [\epsilon, 1-\epsilon]^d$$

for any number ϵ in [0,1] and the narrow strip $E_d(\epsilon)$ derived according to the representation:

$$E_d(\epsilon) = I_d - [\epsilon, 1-\epsilon]^d$$

where the copula represented by the parametric sub-copula and the empirical sub-copula is defined on the d-dimensional unit hypercube $I_d$ and comprises projections on each of a set of d axes, which are all uniform distributions on [0,1] on the middle part $M_d(\epsilon)$, the empirical sub-copula being defined using the same multivariate distribution;

a copula module generating a copula from the sub-copula and the other sub-copula;

a generation module generating random vectors from the copula; and a risk module calculating risk for a portfolio of financial assets based on the random vectors.

12. A system according to claim 11, further comprising:
a weight module to differentially weight the sub-copula and the other sub-copula in the copula.

13. A system according to claim 11, wherein the other copula is derived from a probabilistic location-scale mixture model comprising one of a multivariate normal, a multivariate Student's t, a multivariate skewed Student's t, a multivariate Laplace, a multivariate skewed Laplace, a multivariate hyperbolic distribution, and an infinitely divisible elliptical location-scale mixture distribution.

14. A computer-implemented method for estimating portfolio risk from generated random vectors, comprising the steps of:

storing historical data regarding financial variables of financial assets in a memory comprising a database;

transforming the historical data to a unit hypercube;

estimating parameters of a sub-copula comprising a central point of the hypercube and an other sub-copula comprising extremes of the hypercube, wherein the sub-copula comprising the central point of the hypercube is derived from a multivariate distribution according to the representation:

$$X := \mu + \gamma W + g(W)Z$$

where Z is an infinitely divisible random vector, W is a positive random variable independent of Z, g(x): [0, ∞)−>[0, ∞) is a monotonically increasing function, and μ and γ are two real-valued vectors and parametric sub-copula is defined on a middle part $M_d(\epsilon)$ on a d-dimensional unit hypercube $I_d$ and the empirical sub-copula is defined on a narrow strip $E_d(\epsilon)$, the middle part $M_d(\epsilon)$ derived according to the representation:

$$M_d(\epsilon) = [\epsilon, 1-\epsilon]^d$$

for any number ϵ in [0,1] and the narrow strip $E_d(\epsilon)$ derived according to the representation:

$$E_d(\epsilon) = I_d - [\epsilon, 1-\epsilon]^d$$

where the copula represented by the parametric sub-copula and the empirical sub-copula is defined on the d-dimensional unit hypercube $I_d$ and comprises projections on each of a set of d axes, which are all uniform distributions on [0,1] on the middle part $M_d(\epsilon)$, the empirical sub-copula being defined using the same multivariate distribution;

generating a copula from the sub-copula and the other sub-copula;

generating random vectors from the copula; and calculating risk for a portfolio of financial assets based on the random vectors, wherein the steps are performed by a suitably programmed computer.

15. A computer-implemented method according to claim 14, further comprising:

differentially weighting the sub-copula and the other sub-copula in the copula.

16. A computer-implemented method according to claim 14, wherein the other copula is derived from a probabilistic location-scale mixture model comprising one of a multivariate normal, a multivariate Student's t, a multivariate skewed Student's t, a multivariate Laplace, a multivariate skewed Laplace, a multivariate hyperbolic distribution, and an infinitely divisible elliptical location-scale mixture distribution.

* * * * *